US 7,940,429 B2

(12) United States Patent
Watanabe et al.

(10) Patent No.: US 7,940,429 B2
(45) Date of Patent: May 10, 2011

(54) IMAGE FORMING APPARATUS

(75) Inventors: Koki Watanabe, Moriya (JP); Shinichiro Wakahara, Tokyo (JP); Jiro Shirakata, Kashiwa (JP); Koji Takematsu, Toride (JP); Shinichiro Hosoi, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1086 days.

(21) Appl. No.: 11/248,227

(22) Filed: Oct. 13, 2005

(65) Prior Publication Data

US 2006/0085185 A1    Apr. 20, 2006

(30) Foreign Application Priority Data

Oct. 15, 2004    (JP) .................................. 2004-301503

(51) Int. Cl.
*H04N 1/00* (2006.01)
*H04N 1/04* (2006.01)

(52) U.S. Cl. ......... 358/300; 358/401; 358/474; 358/498

(58) Field of Classification Search ................. 358/1.15, 358/474, 498; 399/49, 170, 351
See application file for complete search history.

(56) References Cited

U.S. PATENT DOCUMENTS

| | | | | |
|---|---|---|---|---|
| 4,572,652 A | * | 2/1986 | Tada et al. | 399/81 |
| 5,289,147 A | * | 2/1994 | Koike et al. | 399/1 |
| H1677 H | * | 9/1997 | Hu et al. | 358/468 |
| 7,130,067 B1 | * | 10/2006 | Shibasaki | 358/1.15 |
| 2003/0036909 A1 | * | 2/2003 | Kato | 704/275 |
| 2004/0132532 A1 | * | 7/2004 | Brosnan et al. | 463/42 |
| 2004/0178259 A1 | * | 9/2004 | Scarafile et al. | 235/379 |
| 2005/0069336 A1 | * | 3/2005 | Kotani | 399/81 |

FOREIGN PATENT DOCUMENTS

| | | | |
|---|---|---|---|
| JP | 5-197230 | | 8/1993 |
| JP | 05197230 | * | 8/1993 |
| JP | 11-122409 | | 4/1999 |
| JP | 2000300852 | * | 10/2000 |
| JP | 2004-128690 | | 4/2004 |
| JP | 2004128690 | * | 4/2004 |

* cited by examiner

*Primary Examiner* — Benny Q Tieu
*Assistant Examiner* — Haris Sabah
(74) *Attorney, Agent, or Firm* — Fitzpatrick, Cella, Harper & Scinto

(57) ABSTRACT

The present invention relates to an image forming apparatus comprising: an operating part which operates the image forming apparatus; an optional first speaker which outputs information guiding operation of the operating part; and a second speaker which outputs sound information that is different from operation guidance information; wherein when the first speaker and the second speaker disposed such that a surface of the first speaker is directed to a front surface of the image forming apparatus that is opposed to the operating part, and a surface of the second speaker is directed to a side surface of the image forming apparatus that is different from the first speaker.

2 Claims, 3 Drawing Sheets

IMAGE FORMING APPARATUS

BACKGROUND OF THE INVENTION

1. Field of the Invention

The present invention relates to an image forming apparatus using electrophotographic type, which forms an image on a recording material by the electrophotographic type. Especially the present invention relates to an image forming apparatus having sound information generating means so that operation guidance or a state of the apparatus can be transmitted by means of sound information.

2. Description of the Related Art

A image forming apparatus today has an operating part provided with a liquid crystal display so that operation guidance or apparatus state are displayed on the display to let a user know such information. However, for a user having bad eyesight, it is more convenient if the user can recognize them by means of sound information rather than visual sense. Japanese Patent Application Laid-open No. 11-122409 describes a speaker for guiding the operation of the image forming apparatus by means of sound information. Japanese Patent Application Laid-open No. 05-197230 proposes a structure in which a speaker for Japanese speech sound information is incorporated in an apparatus main body and disposed behind an operating part, and another speaker for outputting speech sound information of languages other than Japanese can be mounted on an outer portion of the image forming apparatus. Japanese Patent Application Laid-open No. 2004-128690 proposes to provide a user with various information pieces of an apparatus main body of the image forming apparatus by using a speaker. The various information pieces include a structure in which a speaker of a facsimile machine which can be mounted on the image forming apparatus is disposed such that an output direction of the speaker is directed toward an operation side of the image forming apparatus.

In recent years, as information which can be generated from the image forming apparatus, there are various information pieces of the facsimile apparatus which should be made known to a user for using facsimile machine, and guidance information for allowing the user to know various settings or state concerning operation of the apparatus main body of the image forming apparatus and concerning operation of the apparatus main body. However, if the speaker is previously mounted on the image forming apparatus main body in order to provide the user with these information pieces as sound information, there is a problem that the apparatus is increased in size for a user who need not the speaker.

If such a speaker is an optional part, it is possible to prevent the apparatus main body of the image forming apparatus from being increased in size. If a user who needs the sound information mounts the speaker as the optional part, he or she can achieve the purpose, and userability can be enhanced.

When the speaker for such sound information is to be mounted, it is possible to compose such that different kinds of sound information pieces output from the image forming apparatus are output from one speaker. Different kinds of sound information include sound information pieces which are output when the user is not operating the image forming apparatus such as transmission/reception sound of the facsimile machine, and sound information pieces which are output when the user is operating the image forming apparatus such as operation guidance sound information. In such a case, however, if the transmission/reception sound of the facsimile machine is output when the user is operating the image forming apparatus in accordance with the sound information guidance, the user must wait until any of the sound information is completed.

To shorten such waiting time of user, it is preferable that a plurality of speakers are mounted so that these information pieces can be output at the same time. To satisfy this, when the facsimile machine information and the apparatus main body operation guidance information are to be output from the speaker, the facsimile machine information concerning the facsimile machine is output from an electric substrate for the facsimile machine, and information concerning the operation of the apparatus main body is output from a controller of the apparatus main body.

When the plurality of speakers are mounted, there is a merit that the information pieces can be output from the plurality of speakers at the same time. However, when a user is operating the main body of the image forming apparatus while hearing the operation guidance information from one of speaker, another information piece is output from another speaker in some cases. In such a case, the sound information pieces are mixed, and there is a possibility that a user who is operating is prone to fail easily to hear necessary guidance information.

There is a method that when information pieces are output from the plurality of speakers at the same time, sound other than the operation guidance information is lowered. According to this method, however, a user may fail to hear sound other than the operation guidance information on the other hand.

SUMMARY OF THE INVENTION

It is an object of the present invention not to deteriorate the operability using the operation guidance information even if the transmission/reception sound of a facsimile machine is not lowered.

It is another object of the invention to provide an image forming apparatus comprising an operating part which operates the image forming apparatus; an optional first speaker which outputs information guiding operation of the operating part; and a second speaker which outputs sound information that is different from operation guidance information; wherein when the first speaker and the second speaker disposed such that a surface of the first speaker is directed to a front surface of the image forming apparatus that is opposed to the operating part, and a surface of the second speaker is directed to a side surface of the image forming apparatus that is different from the first speaker.

Other objects of the invention will be apparent from the following explanation.

DETAILED DESCRIPTION OF THE PREFERRED EMBODIMENT

Figure 1:
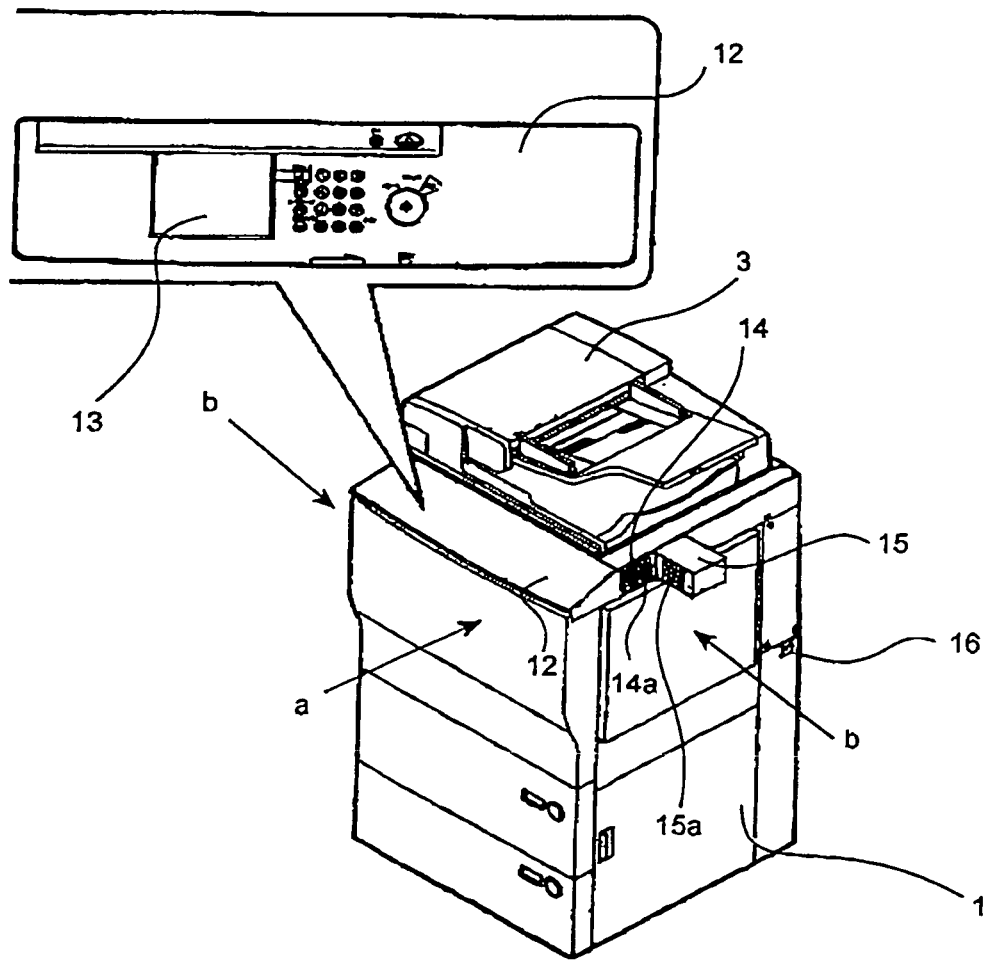
FIG. 1 is a perspective explanatory view of the entire image forming apparatus.
Figure 2:
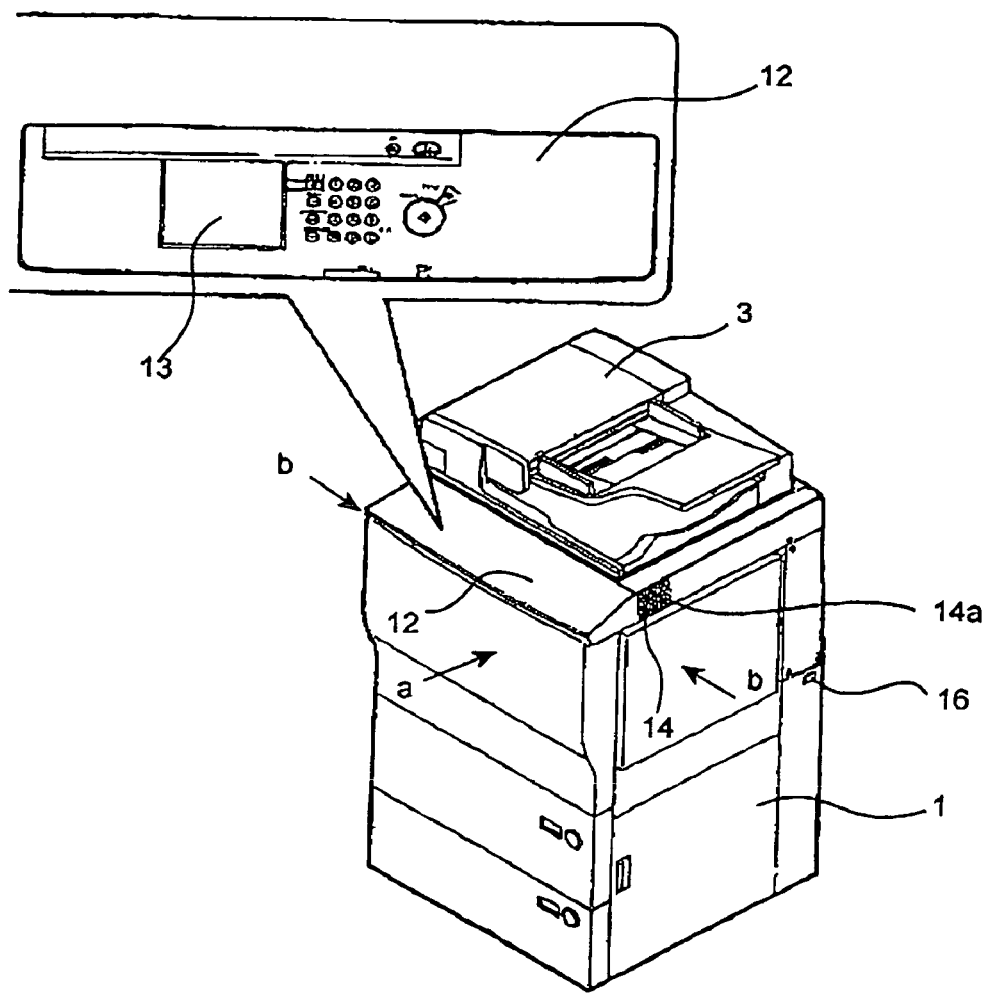
FIG. 2 is a perspective explanatory view of the image forming apparatus when optional sound information generating means is not mounted.
Figure 3:
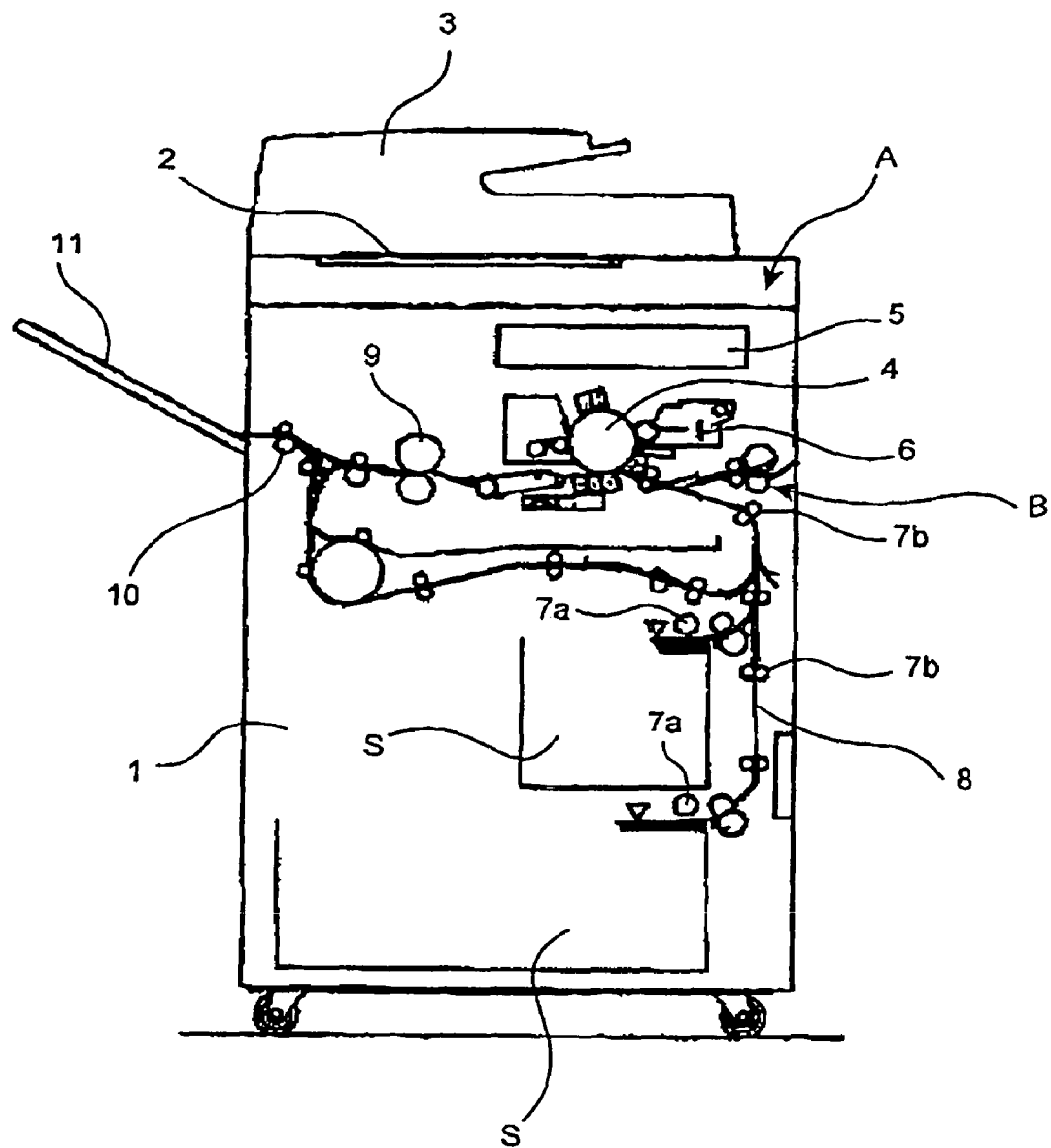
FIG. 3 is a schematic sectional explanatory view of a configuration of the image forming apparatus.

Next, an image forming apparatus according to an embodiment of the present invention will be explained concretely with reference to FIGS. 1 to 3.

(Entire Image Forming Apparatus)

The entire configuration of the image forming apparatus will be explained first with reference to FIG. 3. FIG. 3 is a schematic sectional explanatory view of a configuration of the image forming apparatus.

According to the image forming apparatus of the embodiment, an image reader A is disposed in an upper portion of an apparatus main body 1 thereof, and an image recorder B is disposed in a lower portion of the apparatus main body 1. The image forming apparatus has a copying function in which original information which is read by the image reader A is converted into digital information, the information is transmitted to the image recorder B and the image is recorded, and a facsimile function in which the read information is transmitted to a recorder of another machine through a line of communication to record the image.

The image reader A optically reads a original placed on a platen glass 2 by means of reading means (not shown), converts its signal from optical signal to electric signal, and transmits the electric signal to the image recorder B. The image reader A is provided at its upper portion with a original automatic feeding unit 3 which feeds a plurality of originals to the platen glass 2 in succession.

The image recorder B records an image on a sheet by the electrophotographic type. A rotating photosensitive drum 4 is charged by charging means, and is irradiated with laser beams from a laser irradiation apparatus 5 to form an electrostatic latent image, and the electrostatic latent image is developed using toner by a developing apparatus 6 so that the image can be visible. Sheets S which are set in the lower portion of the apparatus main body are carried upward along a sheet conveying path 8 by a feeding roller 7a and a pair of conveyance rollers 7b in synchronization with formation of the toner image, thereby transferring the toner image in the image recorder B. The sheet on which the non-fixed toner image formed in this manner is conveyed a transferred sheet to a fixing unit 9, the toner image is fixed by heat and then, the sheet is output to an output tray 11 by a pair of output rollers.

(Speaker)

The image forming apparatus is provided with sound information generating means for generating various information pieces which are made known to a user who used the facsimile function. The image forming apparatus is also provided with speakers for transmitting guidance information to the user by means of sound information. The guidance information is information for operating the apparatus main body such as various settings and state concerning operation of the apparatus main body. The configuration will be explained next with reference to FIGS. 1 and 2. FIG. 1 is a perspective explanatory view of the entire image forming apparatus. FIG. 2 is a perspective explanatory view of the image forming apparatus when optional sound information generating means is not mounted. Arrows "a" shown in FIGS. 1 and 2 show a front surface of the apparatus, and arrows "b" show a side surface of the apparatus.

The image forming apparatus of the embodiment is provided at an upper portion of a front surface of the apparatus main body with an operating part 12 for operating the apparatus so that the user operates the operating part 12 at the front surface side of the apparatus (front side of the apparatus). The operating part 12 is provided with an operation button and a liquid crystal display 13. The state of the apparatus is displayed on the liquid crystal display 13. In the operating part 12, it is possible to set a copy button for outputting an image formation starting signal, a setting button of the number of images to be formed, and specification of the image formation.

The image forming apparatus of the embodiment includes two speakers, i.e., a first speaker and a second speaker.

(First Speaker)

The first speaker provides a user with various settings and current state of the apparatus main body, and a user having bad eyesight needs this speaker.

This first speaker ("sound information guidance speaker", hereinafter) 15 is available as an option, and the first speaker 15 can be removed from the apparatus main body of the image forming apparatus. The first speaker is developed for a user having bad eyesight and a user in a wheel chair, and the first speaker is designed such that it can easily be incorporated in the apparatus main body 1 when the user desires to dispose the sound information guidance speaker 15. This speaker outputs operation guidance when the operating part is to be operated. The electric substrate to output the operation guidance is mounted on the image forming apparatus or is previously provided. Therefore, the operation guidance is output when the speaker is mounted on the electric substrate.

The sound information guidance speaker 15 is provided on a right side surface and in the vicinity of a front wall of the apparatus main body 1. A sound information generating surface 15a, i.e., a speaker is directed toward the front surface of the apparatus main body so that the speaker is directed toward a user who uses the apparatus. That is, the sound information guidance speaker 15 is directed toward the front surface with respect to the operating part.

By disposing the speaker at the above position, damage to the speaker due to flying toner is avoided, and sheet conveying sound generated from the sheet conveying path 8 does not wipe out the sound of the sound information guidance speaker 15.

Since the sound information guidance speaker 15 is provided for the user, the sound information guidance speaker 15 is disposed such as to project outward of the apparatus main body 1 in this embodiment so that the user can easily hear the sound information.

(Second Speaker)

The second speaker ("facsimile machine speaker", hereinafter) provides a user with transmission/reception state of the facsimile machine. For example, the facsimile machine speaker outputs tone sound when sending facsimile transmission, signal sound when receiving facsimile transmission and sound information. The facsimile machine speaker 14 is provided on the right side surface and in the vicinity of the front wall of the apparatus main body, the speaker (generating portion of sound information) is directed toward the right side surface (right side surface as viewed from front of the apparatus).

The tone sound when sending facsimile transmission, the signal sound when receiving facsimile transmission and the sound information are output by connecting the electric substrate for facsimile machine and the speaker to each other when the image forming apparatus is provided with the facsimile function.

By disposing the facsimile machine speaker 14 as described above, damage to the speaker due to flying toner is avoided, and sheet conveying sound generated from the sheet conveying path 8 does not wipe out the sound of the facsimile machine speaker 14.

The sound information of the facsimile machine speaker 14 is to provide the user with the transmission/reception state of the facsimile machine by means of sound, this object can be achieved if the user can partially hear the sound information and thus, there is no problem even if the facsimile machine speaker 14 is directed toward the right side of the apparatus main body.

Since the facsimile machine speaker 14 is mounted only when the facsimile machine is mounted, the facsimile machine speaker 14 is disposed inside of an outer casing of the image forming apparatus. FIG. 3 shows the state where only the facsimile machine speaker 14 is connected. The facsimile machine speaker may be available as an option.

Even if the facsimile machine speaker 14 and the sound information guidance speaker 15 are disposed close to each other, since the directions of the surfaces of the speakers are different. Thus, even if the sounds are mixed, it is easy to hear the guiding voice. Thus, even if sound information is output from the facsimile machine speaker 14 when a user is operating the image forming apparatus such as sound information guide, the user is less prone to fail to hear the sound information guide and the like.

And the facsimile machine speaker 14 and the speaker 15 are disposed close to each other. Therefore, even when sound information pieces are output at the same time, a user can hear both the guiding voices without moving his or her body. A concrete case is that at the time of facsimile transmission, a user is guided by sound information from the sound information guidance speaker 15 during sending operation, and the user hears the sending state from the facsimile machine speaker 14 after the sending operation is completed.

A main switch 16 of the apparatus is provided on the right side surface of the apparatus main body 1 in this embodiment. Since the facsimile machine speaker 14 and the sound information guidance speaker 15 are disposed close to the operating part 12 and in the vicinity of the main switch 16, a user in a wheel chair can extremely easily operate.

Although the second speaker is for the facsimile machine in this embodiment, the second speaker may output information that is different from information output from the sound information guidance speaker, and may output information for informing a user of completion of printing operation. Even with such a second speaker, the same effect can be obtained.

In this embodiment, a distance from both the facsimile machine speaker 14 and the sound information guidance speaker 15 to the operating part 12 is about 400 mm so that a user can operate while hearing sound from the speaker 14 or 15. The facsimile machine speaker 14 and the sound information guidance speaker 15 are provided at substantially the same height as that of the operating part 12. From this reason also, this disposition achieves that a user in a wheel chair can operate extremely easily.

The height of ears of a user in a wheel chair is varied person to person, but the height is about 800 mm to 1200 mm. Thus, both the speakers are disposed in this height range so that a user can easily hear information. Therefore, in the embodiment, both the facsimile machine speaker 14 and sound information guidance speaker 15 are disposed at a height of about 900 mm so that sound information is reliably transmitted to the user.

For a user who is not in a wheel chair and who desires to dispose the sound information guidance speaker 15, outputting direction of sound information can be changed to a diagonally upper direction or a diagonally lower direction.

A sound level of the facsimile machine speaker 14 or the sound information guidance speaker 15 can appropriately be changed if a user desires so, and the user can make such change using an operating panel.

Although the embodiment of the present invention has been explained above, the invention is not limited to the embodiment, and the invention can variously be modified within a technical principles.

CROSS-REFERENCE TO RELATED APPLICATION

This application claims the benefit of priority from the prior Japanese Patent Application No. 2004-301503 filed on Oct. 15, 2004 the entire contents of which are incorporated by reference herein.

What is claimed:

1. An image forming apparatus which forms images on a recording medium comprising:
   an operating part which operates the image forming apparatus, wherein the operating part is disposed at a front portion of the image forming apparatus;
   a first speaker attaching portion disposed on an opposite side face of the image forming apparatus from which the image forming apparatus discharges the recording medium and configured to attach a first speaker that outputs operation guidance information, the first speaker attaching portion further configured such that a sound-generating surface of the first speaker is directed towards the front portion of the image forming apparatus and is adapted to project from an outer surface of the image forming apparatus;
   a first speaker attached to the first speaker attaching portion; and
   a second speaker, disposed inside of the image forming apparatus and along the opposite side face from which the image forming apparatus discharges the recording medium, which outputs facsimile receiving sound that is different from the operation guidance information, the second speaker having a sound-generating portion adapted to project sound from inside of the image forming apparatus,
   wherein the second speaker is capable of generating facsimile receiving sound at the same time that the first speaker generates the operation guidance information, and
   wherein in a vertical direction, the height of the sound-generating portion of the second speaker is fixed at the same height of the sound-generation surface of the first speaker and in a front-back direction the sound-generation portion of the second speaker, which is facing in a perpendicular direction of the front-back direction, is positioned forward of the sound-generating surface of the first speaker, which is facing in a front direction.

2. The image forming apparatus according to claim 1, wherein in the vertical direction, the height of the operating part is fixed at the same height of the sound-generating portion of the second speaker and the sound-generating surface of the first speaker.

* * * * *